United States Patent [19]

Hunt

[11] Patent Number: 5,020,572
[45] Date of Patent: Jun. 4, 1991

[54] PIPE REPAIR CLIP

[76] Inventor: William G. Hunt, 1210 N. Main St., Sunset Beach, N.C. 28459

[21] Appl. No.: 451,945

[22] Filed: Dec. 18, 1989

Related U.S. Application Data

[63] Continuation of Ser. No. 208,769, Jun. 20, 1988, Pat. No. 4,890,373.

[51] Int. Cl.$^5$ .............................................. F16L 55/16
[52] U.S. Cl. ............................................ 138/99; 138/97
[58] Field of Search ................. 138/97, 99, 103, 110, 138/177, 178, DIG. 11; 29/402.09; 285/15

[56] References Cited

U.S. PATENT DOCUMENTS

| 185,153 | 12/1876 | Nilson | 138/99 |
| 1,704,760 | 3/1929 | Parker | 138/99 |
| 2,114,145 | 4/1938 | Kant et al. | 138/99 |
| 2,307,148 | 1/1943 | McGuire | 138/99 |
| 2,408,253 | 9/1946 | Diebold | 138/110 |
| 2,492,507 | 12/1949 | Tipton | 138/99 |
| 2,850,045 | 9/1958 | Soehnlen et al. | 138/99 |
| 3,649,055 | 3/1972 | Nilsen | 138/99 |

FOREIGN PATENT DOCUMENTS 69530 7/1949 Denmark ............................ 138/110

Primary Examiner—James E. Bryant, III
Attorney, Agent, or Firm—W. Thads Adams, III

[57] ABSTRACT

A quick, easy, and permanent inline repair of a ruptured pipe is accomplished by the use of one of a family of rigid pipe repair clips shaped to cover the rupture and bond the clip to the pipe in sealing relation to the rupture.

2 Claims, 3 Drawing Sheets

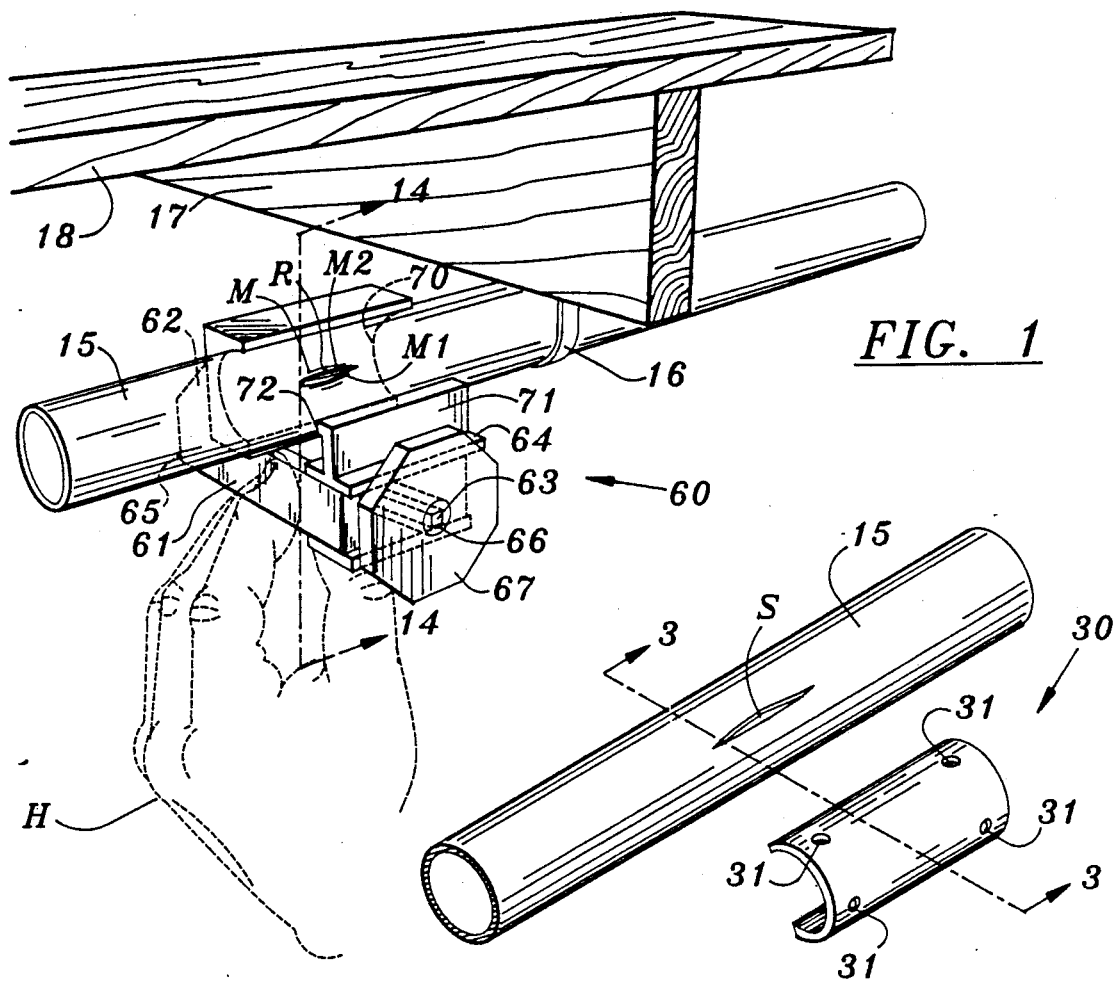
FIG. 1
FIG. 2
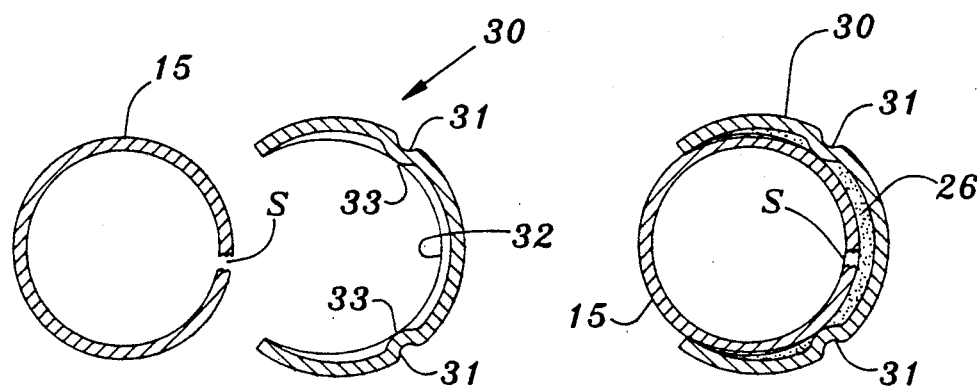
FIG. 3
FIG. 4

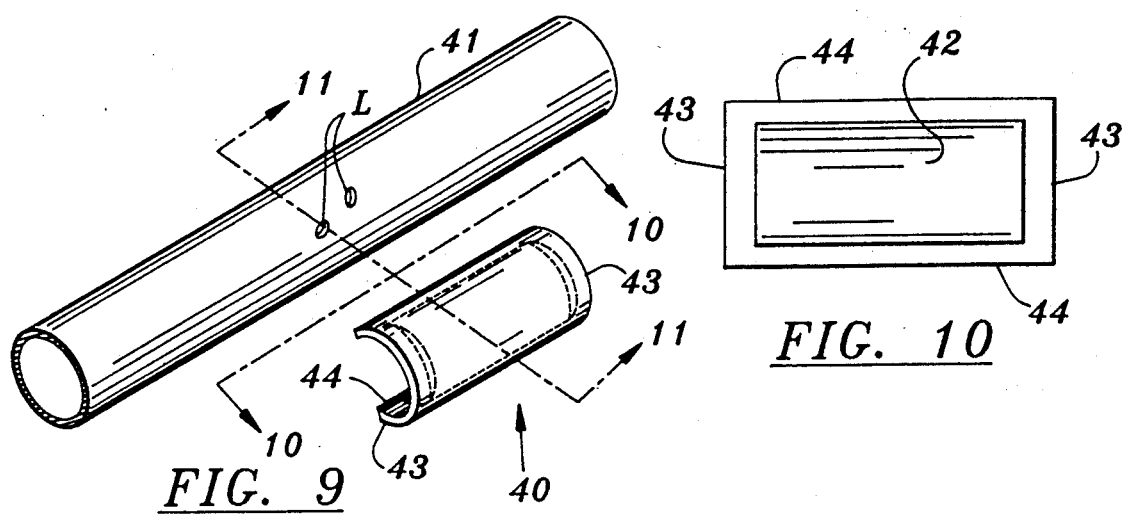
FIG. 9
FIG. 10
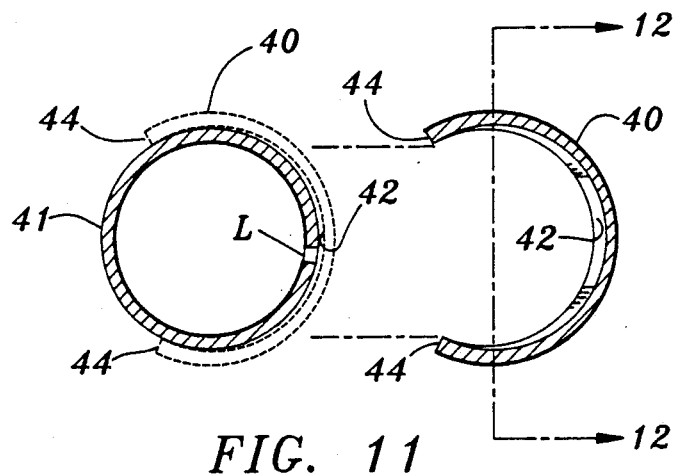
FIG. 11
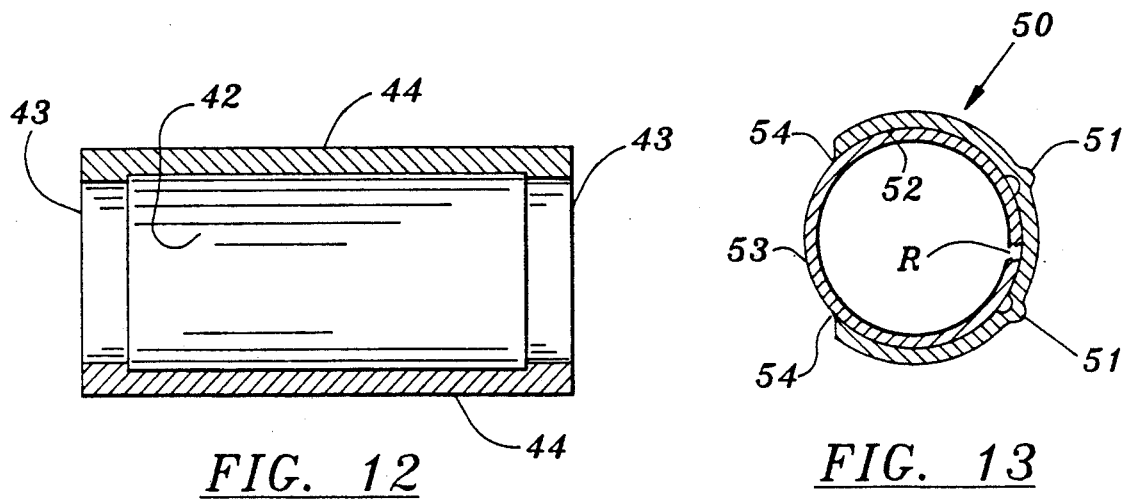
FIG. 12
FIG. 13

PIPE REPAIR CLIP

CROSS REFERENCE TO RELATED APPLICATION

This application is a continuation of pending application Ser. No. 208,769, filed June 20, 1988 for APPARATUS AND METHOD FOR REPAIRING PIPE, now U.S. Pat. No. 4,890,373.

FIELD OF THE INVENTION

This invention relates to the repair of pipes, and more particularly to the repair of holes in water pipes.

BACKGROUND OF THE INVENTION

The transport and distribution of potable water uses a network of pipes to move the water, under pressure, to its destination. Up until about thirty or forty years ago pipes for carrying pressurized potable water were made of cast iron or galvanized iron. More recently, pipes for the distribution of pressurized water are generally made of copper or plastic.

All water pipes are subject to rupture because of the expansion of freezing water within them, yet many water pipes are not adequately protected against freezing. Consequently, a lot of pipes are ruptured in freezing weather.

Leaks are also caused by the deterioration of iron pipes over a period of about thirty years. Small pinholes eventually develop because the flow of water under pressure causes deterioration to begin on the inside of iron pipes and to progress outwardly over a period of time.

Water is conventionally carried through pipe systems under from 75 to 100 pounds pressure, and a lot of water under that pressure can escape through just a small hole in a very short time. It is important that the water be turned off just as soon as a leak is discovered. Most homeowners realize the importance of turning off the water and take the responsibility for that initial step. The next step for most homeowners, due to the complexity of the standard repair procedure, is to call a plumber and wait perhaps for days until one is available.

RUPTURES IN PIPES MADE FROM COPPER, GALVANIZED IRON AND PLASTIC

Copper Pipes are generally considered the best and are the most commonly used for water distribution in the home and in industry. Copper is a soft metal, handles high water pressure, and is easy to work. Copper pipe will burst if over exposed to freezing temperature. The water inside the pipe expands as it freezes and usually pushes the soft metal upwardly and outwardly forming a mound around the rupture in the copper pipe. The rupture is usually a split extending parallel with the pipe and is generally about ¼" to ¾" in length. The metallic mound around the rupture usually extends at least ⅛ of an inch radially beyond the circumference of the pipe.

Galvanized Iron Pipe was in general use for water pipe up until about thirty years ago. Very little is used now for water pipe. Galvanized iron pipe has a wall thickness of about ⅛" and is stronger than copper pipe. However, the expansion of freezing water inside an iron pipe will rupture the pipe. Because of the strength of iron pipe the freeze rupture is usually just a slit extending parallel with the pipe without any significant outward expansion of metal to form a mound such as is generally found in freeze-burst copper pipe.

In addition to being vulnerable to freezing temperatures, iron pipes are also subject to leaking through pin holes which develop as the iron pipes rust from the inside out over a period of about thirty years or more. This is currently a problem in older homes all over the country.

PLASTIC PIPE is generally made from polyvinylchloride and is inexpensive, flexible, and easy to install. For these reasons it is being widely used today in new water systems. Lacking the flexibility of copper, freeze-burst plastic pipe will not generally have a radially extending mound but will have a longitudinal slit that is similar to the slit that develops in a freeze-burst iron pipe.

THE PRIOR ART

According to standard practice, a permanent repair of any of these pipes requires removal and replacement of the ruptured portion of the pipe. This requires a hack saw, the provision of a short length of replacement pipe, two couplings, and, if it is a copper pipe, a blow torch and a soldering job.

The removal and replacement of a ruptured portion of copper pipe, according to the prior art, requires the following twenty four steps, and a plumber's skills:

| | |
|---|---|
| 1. Sand and steel wool the damaged pipe to the left of the hole; | 13. Flux paste the damaged pipe to the left of the hole; |
| 2. Sand and steel wool the damaged pipe to the right of the hole; | 14. Flux paste the left end of the replacement pipe; |
| 3. Cut the damaged pipe to the left of the hole; | 15. Flux paste the right end of the replacement pipe; |
| 4. Cut the damaged pipe to the right of the hole; | 16. Flux paste the left coupling; |
| 5. Provide a length of replacement pipe; | 17. Flux paste the right coupling; |
| 6. Measure and cut replacement pipe; | 18. Place coupling on left end of replacement pipe; |
| 7. Sand and steel wool the left end of the replacement pipe; | 19. Place coupling on right end of replacement pipe; |
| 8. Sand and steel wool the right end of the replacement pipe; | 20. Put the replacement pipe and couplings between the ends of the damaged pipe; |
| 9. Sand and steel wool the left coupling; | 21. Align the pipes for soldering; |
| 10. Sand and steel wool the right coupling; | 22. Light the blowtorch; |
| 11. Return to the damaged pipe; | 23. Apply heat and solder to the left coupling; and |
| 12. Flux paste the damaged pipe to the left of the hole; | 24. Apply heat and solder to the right coupling. |

A similar procedure is carried out for the conventional permanent repair of holes in iron and plastic pipe, except that appropriate steps for fastening the couplings to the ruptured pipe and to the replacement pipe are substituted for the soldering steps enumerated above.

K-POXY STEEL PUTTY is the brand name of a product manufactured by McKim Group, 225 Riverview Avenue, Waltham, Mass. 02254. That product is described by its manufacturer as being useful in the repair of leaking pipes without the usual removal and replacement of the damaged portion of pipe. The manufacturer recommends the following procedure:

(a) Clean, dry, and roughen the area around the leak.
(b) Cut a piece of fiberglass tape long enough to wrap around the pipe three times.

(c) Thoroughly mix the K-POXY STEEL PUTTY as instructed on the box or jar.

(d) Spread the mixed K-POXY on one side of the tape and wrap it three times around the pipe—K-POXY side down.

(e) Cover the tape with more K-POXY and allow it to cure one to three hours.

There is no other known prior art for the permanent repair of holes in metal and plastic pipes.

U.S. Pat. No. 1,704,760 issued Mar. 12, 1929 to Howard Parker for REPAIR ELEMENT FOR FIBROUS CONDUITS shows the use of a fibrous "snap repair element" to repair holes in fibrous conduit used for electric wiring and water. The fibrous conduit is formed by winding a web of cellulose pulp or a sheet of paper on a mandrel until a tube having a desired wall thickness has been formed. The fibrous tube is dried and then waterproofed by impregnating it with pitch.

Parker's "snap repair element" is made of the same fibrous material as is used in making the fibrous tube and is also waterproofed by impregnating it with pitch. Parker's repair element is a short length of semi-cylindrical fibrous conduit having an inside diameter equal to the outside diameter of the fibrous conduit to be repaired. The repair is made by clamping the repair element over the ruptured portion and covering the repair element and the neighboring pipe portion with molten asphalt or cement.

There is no suggestion in Parker that his snap repair element formed of pitch covered fibrous material is useful in repairing anything but pitch covered fibrous conduit. It would not be useful in tody's technology. It is obsolete.

Summary of The Invention

The invention comprises a semi-cylindrical rigid cover having the cross sectional configuration of the letter "C" and herein sometimes called a C-clip. The C-clip is formed of copper or plastic to tightly clamp on a pipe and cover a hole.

A professional and permanent repair of a hole in a pipe can be made by one not skilled in plumbing by applying a quick acting bonding agent to the space inside the medial sealing portion of a C-clip and then clamping the C-clip over the hole in the pipe to seal the hole in a leakproof manner. The C-clip is installed with finger pressure and the inherent clamping action of the C-clip holds it in a vise-like grip firmly around the pipe. The pipe repair is made "in-line" without having to cut out the damaged portion of the pipe and replace it.

When used by a skilled plumber, the invention reduces his time and material costs more than 65% for each repair.

The disclosure includes several embodiments of the sealing portion which provides an enclosed space between the clip and the pipe to receive and retain a bonding agent to bond the C-clip to the pipe and seal the rupture. One embodiment provides enough space to also accomodate the usual mound around the rupture in a freeze-burst copper pipe.

Another embodiment of the C-clip fits snugly against the pipe with no space between the cover and the pipe. It is intended that this cover be soldered to the pipe after it has been clamped over the ruptured area.

If the mound is too big for the C-clip, the hand held utility tool illustrated in FIG. 1 of the drawings and disclosed and claimed in my pending patent application Ser. No. 208,769, filed June 20, 1988 for PIPE REPAIR APPARATUS AND METHOD is first used to restore the mound around the rupture to its intended position in line with the pipe, and then a C-clip is clamped and sealed over the remaining slit.

The peripheral edges of other embodiments of the C-clip fit snugly against the pipe so that solder can be used in lieu of a bonding agent, if desired, to bond the C-clip to the pipe in sealing relation to the rupture.

BRIEF DESCRIPTION OF THE DRAWINGS

FIG. 1 is a perspective environmental view, with parts broken away, illustrating a freeze-burst copper pipe with a mound of expanded metal surrounding the rupture and a utility tool held in operative position to restore a portion of the mound to its intended position in line with the pipe preparatory to sealing the rupture with a bonding agent and covering it with a C-clip;

FIG. 2 is an exploded perspective view of the pipe shown in FIG. 1 after use of the utility tool to restore the mound to its intended position and reduce the rupture to a slit, and showing a C-clip positioned to cover the slit;

FIG. 3 is a sectional view taken substantially along the line 3—3 in FIG. 2;

FIG. 4 is a sectional view similar to FIG. 3 but showing the C-clip and a bonding agent assembled in operative position covering and sealing the rupture;

FIG. 9 is an exploded perspective view, with parts broken away, illustrating pin holes in an iron or plastic pipe and showing a recessed C-clip positioned to cover the holes;

FIG. 10 is a side elevation looking in the direction of the arrows 10—10 in FIG. 9;

FIG. 11 is a sectional view taken substantially along the line 11—11 in FIG. 9;

FIG. 12 is a sectional view taken substantially along the line 12—12 in FIG. 11; and FIG. 13 is a sectional view similar to FIG. 4 but illustrating a Braille C-clip soldered in place over a hole in a metal pipe;

DETAILED DESCRIPTION OF THE INVENTION

Referring more specifically to the drawings, FIG. 1 illustrates a length of copper pipe 15 conventionally fastened as by a bracket 16 to a floor joist 17 beneath flooring 18. The pipe may carry potable water under pressure.

Figure 5:
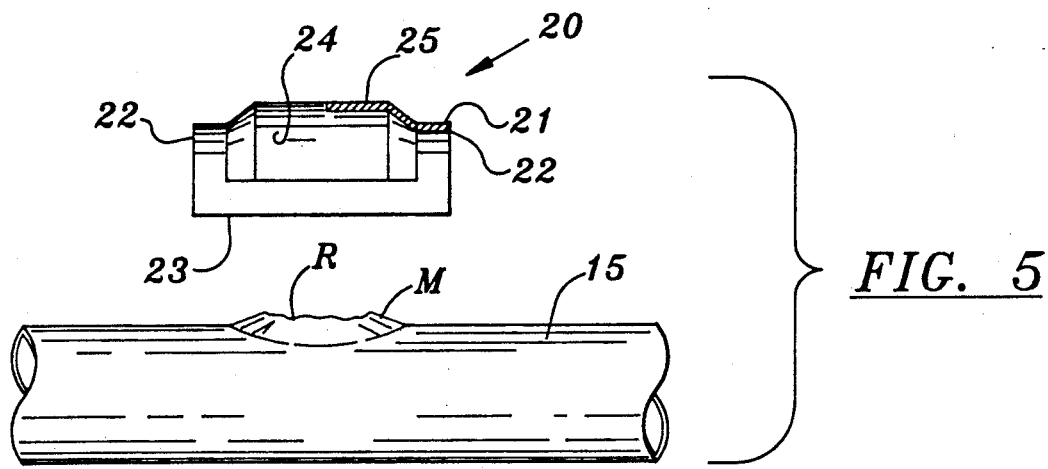
FIG. 5 is an exploded perspective view, partially in section and with parts broken away, showing a ruptured copper pipe with a mound surrounding the rupture and a chambered C-clip positioned to cover the mound and the rupture.

The copper pipe 15 is shown as having a rupture R of the type commonly caused by water freezing and expanding within the pipe. Due to the softness of copper, the expansion of the water generally causes a radially extending flaring of the metal around the rupture, resulting in the buildup of a metallic mound M around the rupture R, the height of the mound being illustrated in the elevation view of FIG. 5.

According to the invention, the mound can either be covered with an appropriately shaped C-clip or first restored to its intended positon in line with the pipe, and the rupture then permanently repaired inline with a C-clip without having to remove and replace the ruptured portion of pipe.

The Dimpled C-Clip

Inline ruptures or slits such as shown at S in FIGS. 2–4 occur in freeze-burst iron and plastic water pipes. These slits, and similar slits in copper pipe after the mound around a freeze-burst pipe has been restored, can be repaired with the dimpled C-clip 30 of FIGS. 2–4 or the recessed C-clip 40 of FIGS. 9–12 in the same manner as will be described for a permanent repair with the chambered C-clip 20 of FIGS. 5–8.

The dimpled C-clip 30 may be made of copper in an arcuate configuration to clamp over a slit S with its longitudinal edges snugly engaging the pipe as shown in FIG. 4. Dimples 31 are provided at each end of the C-clip 30. The dimples 31 protrude inwardly beyond the inner surface 32 of the C-clip 30 to define stand-offs 33 as shown in FIGS. 3 and 4. The stand-offs 33 seat against the pipe and serve as spacers to prevent the smooth sealing portion between the ends of the C-clip from seating on the pipe and squeezing out the bonding agent 26.

The distance the stand-offs 33 protrude beyond the inner surface of the C-clip predetermines the thickness of the layer of bonding agent between the C-clip and the pipe. A distance of 0.032 of an inch has been found satisfactory but the distance is not critical and may be changed as desired. The spacing provided by the stand-offs 33 also compensates for imperfections in the repair area such as roughness and minor variations in the diameter of the pipe.

All embodiments of the C-clip or rigid cover have a slightly larger inside diameter than the pipe they are intended to fit, but the longitudinal edge portions of the C-clips are spaced apart slightly less than the outside diameter of the pipe so the C-clips will snugly engage pipes to be repaired. The C-clips are thus enabled to be pressed on the pipe and be self clamping and firmly attached to the pipes. The C-clip protects the layer of bonding material from external damage and deterioration from ultraviolet rays while restoring the pipe to at least its original strength for a permanent repair, and providing a professional looking finish to the job.

The Chambered C-Clip

Figure 6:
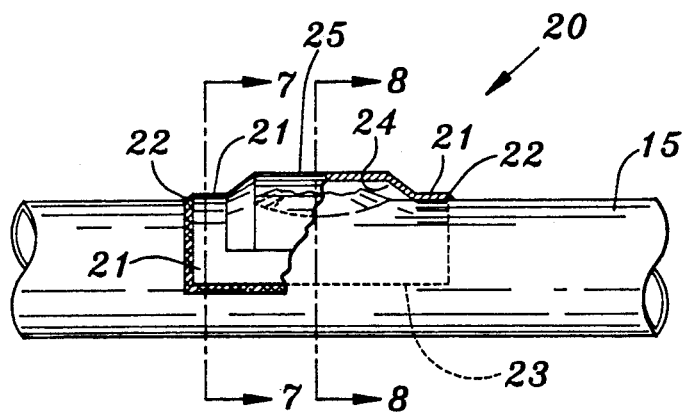
FIG. 6 is a perspective view of the pipe and C-clip shown in FIG. 5 after the chambered C-clip has been assembled to cover the rupture and the mound.
Figures 7, 8:
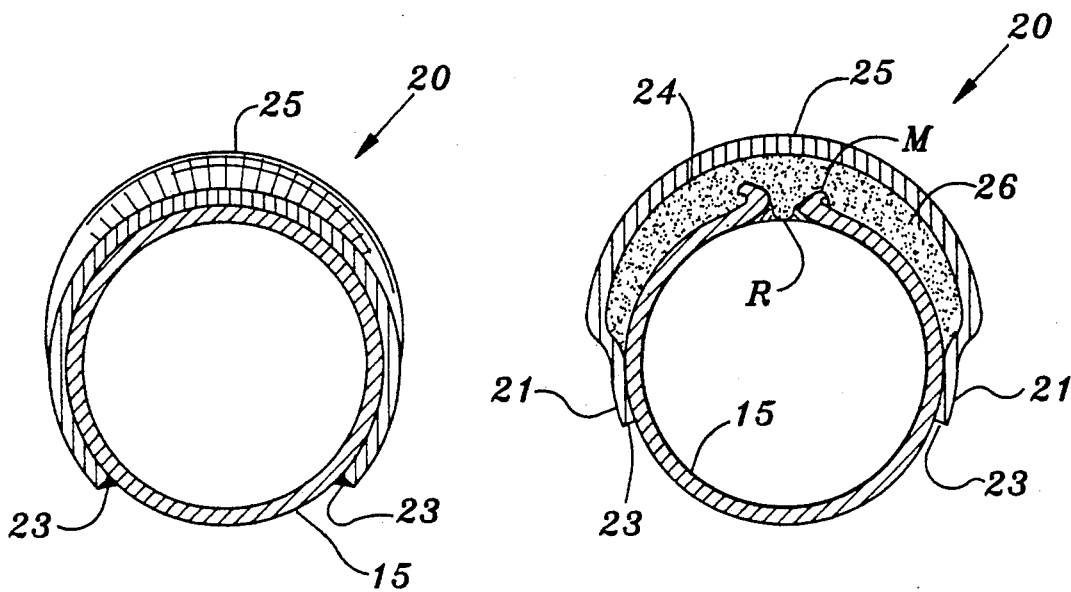
FIG. 7 is a sectional view taken substantially along the line 7—7 in FIG. 6.
FIG. 8 is a sectional view taken substantially along the line 8—8 in FIG. 6 and showing a bonding agent sealing the rupture and bonding the chambered C-clip to the pipe.

Referring to FIGS. 5–8, a chambered C-clip is broadly indicated at 20. The chambered C-clip is preferably formed from copper in a cross-sectional arcuate configuration and is particularly intended for use on freeze-burst copper pipes. The C-clip 20 includes an arcuate base 21 extending around the periphery of the cover 20 and dimensioned to fit snugly against the pipe to be repaired. End edges 22 are spaced apart enough to extend beyond the rupture R. Longitudinal edges 23 clamp over the diameter of the pipe 15, as seen in FIG. 8.

The C-clip 20 includes a radially protruding chamber 24 defining a sealing portion 25 of the C-clip 20 between end edges 22 and longitudinal edges 23 of the base 21. As illustrated in FIG. 6, the sealing portion extends sufficiently beyond the base 21 to cover the metallic mound M. Some mounds are too large to be accomodated by the chambered C-clip 40. Such mounds may be restored with the utility tool disclosed in FIG. 1 before using a selected C-clip to make the repair.

The repair with the chambered C-clip 20, as with the other C-clips, is made by first turning off the water and drying and cleaning the area of the pipe neighboring the rupture. Then the inside of the C-clip 20 is filled with a bonding agent 26 and the C-clip is quickly clamped about the pipe 15 as shown in FIG. 6 to cover the rupture R and its mound M. A preferred bonding agent cures in less than ten (10) minutes, after which the rupture is permanently sealed and the pipe is restored to useful condition. The total repair time is about fifteen (15) minutes.

The Recessed C-Clip

The recessed C-clip 40 of FIGS. 9–12 can be used to repair the slit S of FIG. 4 and pinhole leaks such as shown at L in FIGS. 9 and 11. The recessed C-clip 40 is made of plastic and is intended for the repair of leaks in plastic or iron pipe 41. Like the other C-clips, the recessed C-clip 40 extends more than 180° around the pipe when firmly clamped over the leak L as shown in the phantom line position of FIG. 11. Unlike the chambered C-clip 20, the outer surface of the recessed C-clip 40 is uniformly smooth. A recessed sealing portion 42 is formed inside the C-clip 40 between its end edges 43 and its longitudinal edges 44. The recessed sealing portion 42 provides space for a predetermined thickness of the bonding agent 26.

The Braille C-Clip

Referring to FIG. 13, a Braille C-clip 50 is like the dimpled C-clip 30 of FIGS. 1–4, except that the dimples indicated at 51 in FIG. 13 extend outwardly instead of inwardly. Instead of spacers, the outwardly extending dimples 51 serve as manual guides to enable the Braille C-clip 50 to be properly positioned over a rupture R in areas where the rupture and the C-clip cannot be seen.

The Braille C-clip 50 is illustrated as having a generally smooth inner surface 52 which uniformly fits snugly against a ruptured metal pipe 53. The Braille C-clip 50 can be soldered to a metal pipe as indicated at 53 in FIG. 13. The showing of solder at 54 is exaggerated for the purpose of illustration. Actually, capillary action draws the solder in to completely cover the inner surface of the clip and the opposing surface of the pipe. Very little solder will be actually seen at the edges of the clip.

Preferred Bonding Agents

A preferred bonding agent cures in less than 10 minutes and is thixotropic so it will not run or drip. It will withstand thermocycling and is effective from 50 degrees below zero to 250 degrees F.

Satisfactory bonding agents having the qualities described are sold by (1) Lucas-Milhaupt, Inc., 5555 South Pennsylvania Avenue, Cudahy, Wis. 53110 (under the brand name CHEMPCO 683); (2) Rexnord Chemical Products, Inc., 5103-T West Beloit Road, West Milwaukee, Wis. 53214 (under the brand name 4 MINUTE PUTTY); (3) Tra-Con Inc., 55-T North Street, Medford, Mass. 02155 (under the brand name TRA-BOND 2106T); and (4) McKim Group, 225 Riverview Avenue, Waltham, Mass. 02254 (under the brand name K-POXY-PUTTY).

The Use of Solder

The chambered C-clip 20 is specifically structured to provide space for a bonding agent, but it is also structured for use with solder instead of a bonding agent, if desired. The wide marginal edges of the chambered C-clip 20 fit snugly against the pipe and solder may be satisfactorily applied in the usual manner. The snug fit of the Braille C-clip 50 to the pipe renders the Braille C-clip specifically structured for use only with solder. The soldering of two pieces of metal together requires a snug fit because solder is not a gap filler.

The structure of the Braille C-clip 50 can be modified so that the Braille C-clip can be sealed to the pipe with a bonding agent such as indicated at 26 in FIGS. 4 and 8. Specifically, the Braille C-clip 50 can be provided with spacers such as the stand-offs 33 in FIGS. 3 and 4 or with the previously described chambered or recessed configuration to provide space for receiving and retaining a bonding agent between the pipe 53 and the C-clip 50.

The Utility Tool

The utility tool illustrated at 60 in FIG. 1 is useful for reducing mounds surrounding ruptures in freeze-burst copper pipe so C-clips can be clamped and bonded over the slits for permanent repair of the pipes, as more fully appears in my said pending patent application Ser. No. 208,769. The following description of the utility tool is offered to illustrate its cooperation with the C-clip in permanently repairing freeze-burst copper pipe.

The utility tool 60 is a small hand tool comprising a body portion 61 including a bearing plate 62 formed integrally therewith or fixed against movement relative to the body portion 61. A shaft 63 extends beyond the front 64 and the rear 65 of the body portion 61. The shaft 63 is threadably mounted in the body portion 61 beneath the bearing plate 62 and the protruding ends of the shaft 63 are squared for the selective reception of a rectangular opening 66 in the hub of a removable handle 67.

Ruptures in pipes sometimes occur in inconvenient locations that are hard to reach. The utility of the tool 60 is increased by providing for the handle 67 to be attached to either end of the shaft 63.

The bearing plate 62 includes an arcuate cradle 70 extending transversely across the rear 65 of the body 61 and fixed against movement relative to the body 61. The inside diameter of the cradle 70 is the same as the outside diameter of a pipe to be repaired.

A jaw 71 is freely mounted on the shaft 63 for reciprocal movement along the body portion 61 relative to the bearing plate 62 as the shaft 63 is rotated by manipulation of handle 67. The rearward portion of the jaw 71 serves as a ram 72 and extends upwardly to the center of the cradle 70. The ram 72 is supported on the shaft 63 for limited movement toward and away from the cradle 70 as the shaft is rotated.

As illustrated in FIG. 1, the tool 60 is initially positioned for the ram to move against portion M-1 of the mound and restore it to its intended position in line with the pipe. The tool 60 is then repositoned for the ram to move against portion M-2 of the mound and restore it to its intended position in line with the pipe. Any of the C-clips can then be clamped on the pipe and bonded in sealing relation to the slit S.

There is thus provided a family of C-clips intended for the rapid and easy permanent repair of ruptures in different kinds of pipe, without the need for a plumber's skill.

Although specific terms have been employed in describing the invention, they have been used in a descriptive and generic sense only, and not for the purpose of limitation.

I claim:

1. A pipe repair clip for sealing a rupture in a pipe and comprising:
    (a) a piece of imperforate rigid material formed in an arcuate configuration in cross-section and having opposed longitudinal side surfaces and opposed transverse end surfaces each conforming to an arcuate surface of the pipe to be repaired around the periphery of the rupture, said clip defining an arc of substantially greater than 180 degrees to permit the clip to be snapped over the pipe to be repaired and held in position over the rupture while the repair takes place;
    (b) a centrally disposed raised chamber positioned radially outwardly from the pipe in the area of the rupture when the clip is in position on the pipe to be reparied and constituting a means to receive and enclose a sealing and bonding agent; and
    (c) said chamber further having an integrally formed tapering transition area joining said side surfaces and end surfaces with said chamber to define a tapered area of a size to surround the area of the rupture to receive and enclose a sealing and bonding agent.

2. A pipe repair clip according to claim 1, wherein said clip includes at least one dimple positioned on and raised above the surface of the clip to permit manual orientation of the chamber over the rupture in instances when the rupture and the clip cannot be seen.

* * * * *